United States Patent [19]
Liborius

[11] Patent Number: 5,325,606
[45] Date of Patent: Jul. 5, 1994

[54] PROCESS AND APPARATUS FOR DRYING AND CALCINING SODIUM BICARBONATE

[75] Inventor: Erik Liborius, Ellicot City, Md.

[73] Assignee: Niro A/S, Soeborg, Denmark

[21] Appl. No.: 994,429

[22] Filed: Dec. 23, 1992

[51] Int. Cl.⁵ .................................................. F26B 3/08
[52] U.S. Cl. .......................................... 34/589; 34/66; 34/82; 34/85; 34/591; 165/104.16; 422/142; 432/58
[58] Field of Search ............. 34/10, 57 R, 57A-E, 34/13, 20, 60-62, 66, 79, 82, 35, 86; 165/104.16; 432/58; 110/245; 122/4 D; 422/143, 142; 431/7, 170, 326; 423/206 T

[56] References Cited

U.S. PATENT DOCUMENTS

| | | |
|---|---|---|
| 3,933,977 | 1/1976 | Ilardi et al. ................. 423/206 T |
| 4,974,334 | 12/1990 | Roddewig ................................... 34/10 |
| 5,034,196 | 7/1991 | Zenz et al. ........................... 422/142 |
| 5,184,671 | 2/1993 | Alliston et al. .............. 165/104.16 |

FOREIGN PATENT DOCUMENTS 715469 1/1980 U.S.S.R. .

Primary Examiner—Denise Gromada
Attorney, Agent, or Firm—Armstrong, Westerman, Hattori, McLeland & Naughton

[57] ABSTRACT

Damp sodium bicarbonate filter cake is pre-dried and calcined to produce light soda as in a process comprising a carbon dioxide ebullated fluid bed pre-dryer working in connected series relationship with a plurality of carbon dioxide ebullated fluid bed/bag filter calcination systems such that bicarbonate decomposition during pre-drying is minimized and the thermal treatment of small particles during calcination is optimized.

9 Claims, 4 Drawing Sheets

PROCESS AND APPARATUS FOR DRYING AND CALCINING SODIUM BICARBONATE

FIELD OF THE INVENTION

The present invention is directed to a method and apparatus for drying sodium bicarbonate wet cake and for producing a substantially anhydrous sodium carbonate product from the dried sodium bicarbonate.

DESCRIPTION OF THE PRIOR ART

Traditionally, sodium bicarbonate wet cake has been dried and calcined to form sodium carbonate using conventional rotary steam tube dryers such as that shown in FIGS. 4(a) and 4(b) of the drawings. For the high temperature dehydration of inorganic salts, such dryers are built for steam pressures up to thirty five atmospheres (525 lbs/sq. in. steam). Steam is introduced and condensate is removed through a rotary joint 11 attached to a manifold located at a product discharge and purge gas inlet end of the shell 12. Feed is introduced and purge gas is removed through a stationary throat piece 14 fitted to the shell by a sliding seal at the end opposite the manifold. The dryers are operated slightly below atmospheric pressure to prevent dust and vapor escape.

Rotary steam tube dryers used for drying and calcining sodium bicarbonate are difficult to maintain and require a continuous supply of costly high pressure steam for operation. In contrast to the conventional rotary steam tube dryers, the present invention satisfies a long felt industrial need by providing a process and apparatus capable of producing high quality dry sodium bicarbonate and sodium carbonate products which is not dependent on high pressure steam and thus provides a more economical operation in terms of thermal energy and maintenance cost requirements.

SUMMARY OF THE INVENTION

The present invention provides a method of drying and calcining sodium bicarbonate whereby product quality of the sodium bicarbonate is improved and the requirement for high pressure steam is minimized.

The invention provides a method of drying wet cake sodium bicarbonate in an atmosphere of recycled essentially carbon dioxide gas using low pressure steam.

The presence of an atmosphere of essentially carbon dioxide in the drying process represses the formation of sodium carbonate thus producing a more uniform and improved, product quality. Further, the temperature of the drying gas can be increased to increase unit drying capacity without product degradation. The drying operation can be conducted utilizing relatively inexpensive low pressure steam.

In the method according to the invention, calcination of the dried sodium bicarbonate is accomplished in a plurality of inter-connected fluid bed/fines filter assemblies sequentially connected together and designed to minimize thermal energy costs and to optimize product quality. Low pressure, low cost steam is used for drying the sodium bicarbonate and for converting up to about 85% of the sodium bicarbonate to sodium carbonate. In this context approximately 30–80 psig is considered to be a low pressure range. Medium pressure steam is used to bring the conversion of sodium bicarbonate to sodium carbonate to about 95% and high pressure steam is needed only to bring the conversion to greater than 99%. In this context approximately 80–120 psig is considered to be a medium pressure range and above 120 psig is considered to be in the high pressure range.

In the present invention a fluid system is provided which utilizes a plurality of inter-connected fluid beds such that, in the case of drying and calcining sodium bicarbonate, the temperature and quantity of thermal energy transferred per unit of time from the heating means to the material being treated can be independently controlled in each fluid bed. Such control is not possible in conventional steam tube dryer equipment.

In the method of this invention each of the several sequentially interconnected fluid beds is designed to effect a specific heat energy transfer per unit time to evaporate a desired amount of water or to cause a given quantity of sodium bicarbonate to form sodium carbonate.

In the method of this invention the fluid bed constituting the pre-dryer section is provided of such a volume and dimensions that when the fluidized bed is operated at a controlled pre-determined temperature a desired quantity of particulate wet sodium bicarbonate cake is dried in a desired unit of time. The pre-dryer fluid bed section is operated in a dense phase mode to minimize the elutriation of fines. The heat required is supplied by low pressure steam provided to heating elements located in the fluid bed and designed to transfer the required heat. An optional auxiliary gas heater may also be employed for more precise control of gas temperature.

In a preferred embodiment of the present invention, all solids exit the pre-dryer at a design production rate by underflow as feed to the first calcining stage. The first and following calcining stages operate such that the fluidized product, driven by the fluid pressure head, passes by underflow means from a first calciner stage into a second calciner stage and then into a third calciner stage.

The heat required is supplied by steam of successively increasing pressure provided to heating elements located in the interconnected fluid bed sections and designed to transfer the required heat. An optional auxiliary gas heater may also be employed for more precise control of gas temperature.

Fluidized product passes from the third calciner stage into a final fluid bed comprising a cooler section and then exits the system.

The cooling required is supplied by a liquid coolant provided to cooling elements located in the fluid bed and designed to transfer the required cooling. An optional auxiliary gas cooler may also be employed for more precise control of gas temperature.

The top level of the fluid bed in the cooler section is independently controlled so as to maintain a desired top level of fluidized material passing through the calcining stages.

In the preferred embodiment of this invention fines are handled so as to obtain complete conversion of the sodium bicarbonate to sodium carbonate. Fines eluted from each fluid bed are trapped in a filter and then, on carbon dioxide pulsing of the filter bags, the fines drop back into the bed or into a following bed. A directed flow of gases bears levitated fines towards a settling chamber for discharging fines by gravity flow into the product cooler section. This directed flow of gases is obtained by design of the fines filter units located over the fluid bed calciner.

In the present invention water vaporized in the pre-dryer section exits the system as gas scrubber condensate. Water formed in the calcination process exits the system as condensate obtained by cooling the gases exiting the calciner fines filters.

In the method of this invention wet sodium bicarbonate cake enters the system containing between approximately 5-23% free water. An intermediate sodium bicarbonate product containing less than 0.2% water is produced in the pre-dryer.

The final sodium carbonate product from the cooling bed is practically anhydrous.

The present invention will be more fully understood following review of the drawings appended hereto and the following detailed description of a preferred embodiment of the invention.

DESCRIPTION OF THE PREFERRED EMBODIMENT

Figure 1:
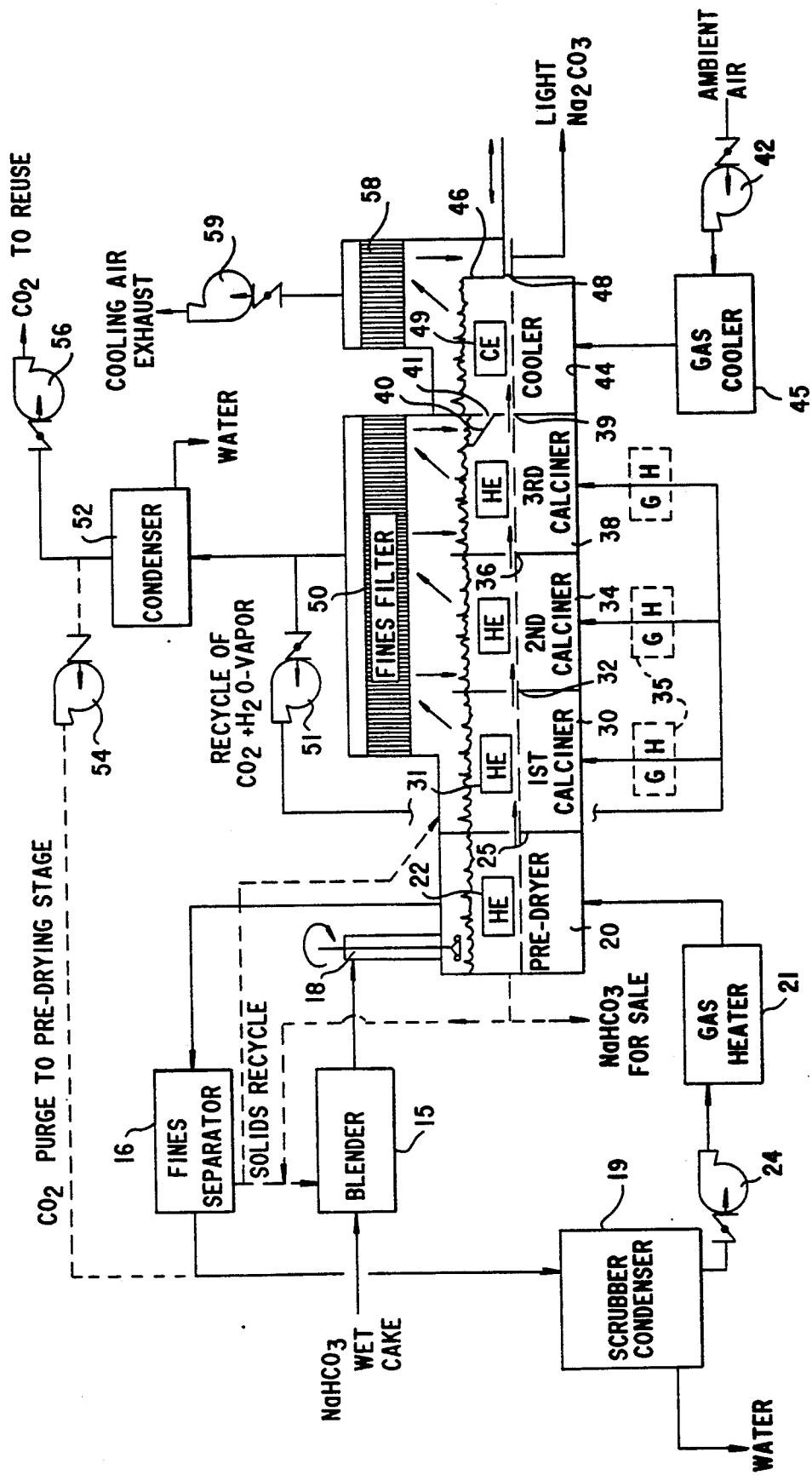
FIG. 1 illustrates the apparatus and the flow of solids and gases in the apparatus according to the present invention.

FIG. 1 diagrammatically illustrates a fluid bed sodium bicarbonate filter cake drying operation coupled with a fluid bed sodium bicarbonate calcining operation in accord with this invention. The drying and calcining operations are conducted in an atmosphere of carbon dioxide and water vapor.

The apparatus includes a pre-dryer 20 which is a fluidized bed dryer and receives a comminuted particulate comprising sodium bicarbonate wet cake, recycle dryer product, and fines from a blender 15, fines separator 16 and a wet cake disperser 18. Under favorable conditions, the solids recycle system and the blender 15 can be by-passed and the wet cake can be fed directly into the wet cake disperser 18. In such an operation the fines from the fines separator 16 are directed into a first calciner stage 30 as indicated by the dash line in FIG. 1. Recycled carbon dioxide gas is obtained and introduced into pre-dryer 20 via fines separator 16 through scrubber condenser 19 and gas heater 21. Pre-dryer 20 is sized and configured such that a predetermined unit design quantity of sodium bicarbonate wet cake can be dried in a unit time operating in a dense phase fluid bed mode. Heat is supplied to the pre-dryer through heating element (HE) 22 which is supplied with low pressure steam in an amount and of a quality such that on condensation it provides the heat energy necessary to dry the charged quantity of wet sodium bicarbonate in unit time.

An adjustable dried product exit gate 25 is provided below the level of fluidized material in the pre-dryer 20 and is adjustable to maintain the design level of fluidized material in the pre-dryer 20 while passing the design capacity of the unit in fluid flow to the first calciner stage 30.

The first calciner stage 30 is sized and configured such that when operated in a dense phase fluid bed mode the top of the bed is located such that material will pass in fluid flow through gate 25 at the design rate from the pre-dryer 20 into the first calciner stage 30 and reach a fluidized bed top level near that maintained in the pre-dryer. The fluidized volume of the first calciner stage 30 is such that the average residence time of material in the first calciner stage 30 and the quantity of heat supplied by the heating elements (HE) 31 in unit time is sufficient to obtain the designed extent of calcination in the first calciner stage. The heating elements 31 are heated by steam. However, optional gas heaters (GH) 35 may also be employed to control the temperature in each calciner stage. Partially calcined material exits calciner stage 30 via under flow gate 32 and enters the second calciner stage 34.

The fluid bed static head in the second calciner stage 34 is slightly lower than the static head in the first calciner stage 30 to obtain the design rate of material flow from the first calciner stage into the second calciner stage. Fines eluted from the first calciner stage are captured by fines filter 50 which consists of an array of filter bags and returned to the fluid beds by periodic pulsing of the filter bags. Partially calcined material leaves the second calciner stage 34 via under flow gate 36 and enters the third calciner stage 38.

The fluid bed static head in the third calciner stage 38 is slightly lower than in the second calciner stage to obtain fluid flow of the second calciner stage product into the third calciner stage 38.

A settling chamber 40 provided at a rear or remote end of the third calciner stage receives the fines from the rear end of the fines filter over the third calciner stage 38. Any material that reaches the settling chamber 40 falls by gravity through a small opening 41 in the wall into a product cooling 44. Ambient air is delivered by a flow control blower 42 to a gas cooler 45 and then to product cooling chamber 44. Chamber 44 is also cooled by a cooling element (CE) 49.

An underflow gate 39 normally remains open when bed levels have been established. By adjusting the pressure to the same level on both sides of the wall between the third calciner stage fluid bed and the cooling fluid bed 44 exchange of gases between the two fluid beds can be avoided or limited to an insignificant degree.

The fluid bed static head in the cooling fluid bed 44 is slightly lower than in the third calciner stage 38 so as to obtain fluid flow of the third calciner stage product into the cooling fluid bed 44.

The top level of fluidized material in the product cooler or cooling fluid bed 44 is established and maintained by adjustment of an adjustable weir 46. Material over flowing weir 46 falls by gravity and exits the system. A gate 48 normally remains closed during operation of the unit and is used to empty the unit for servicing.

Figure 2:
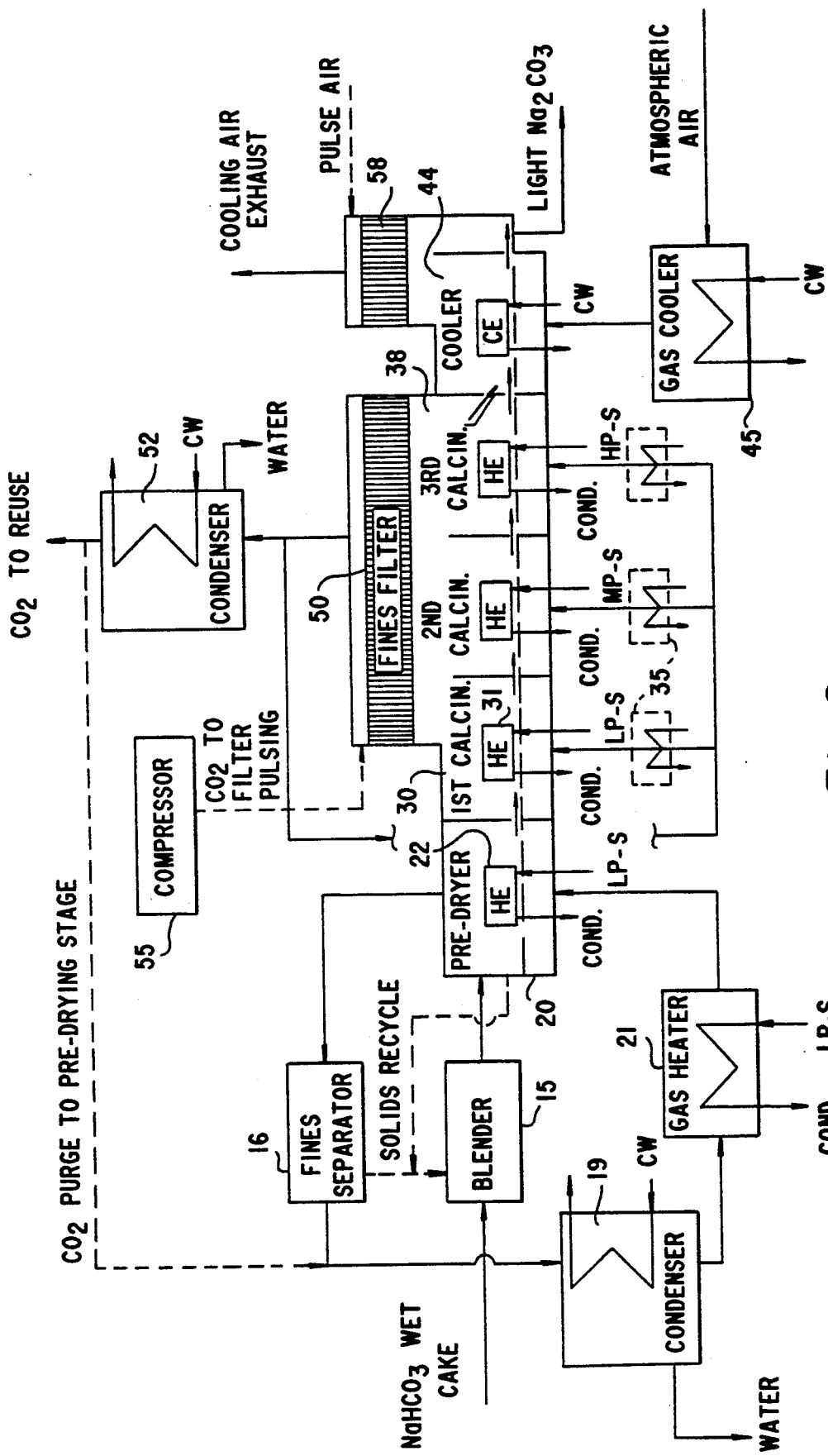
FIG. 2 is a graphic representation of the utilities flow in the apparatus according to the present invention.
Figure 3:
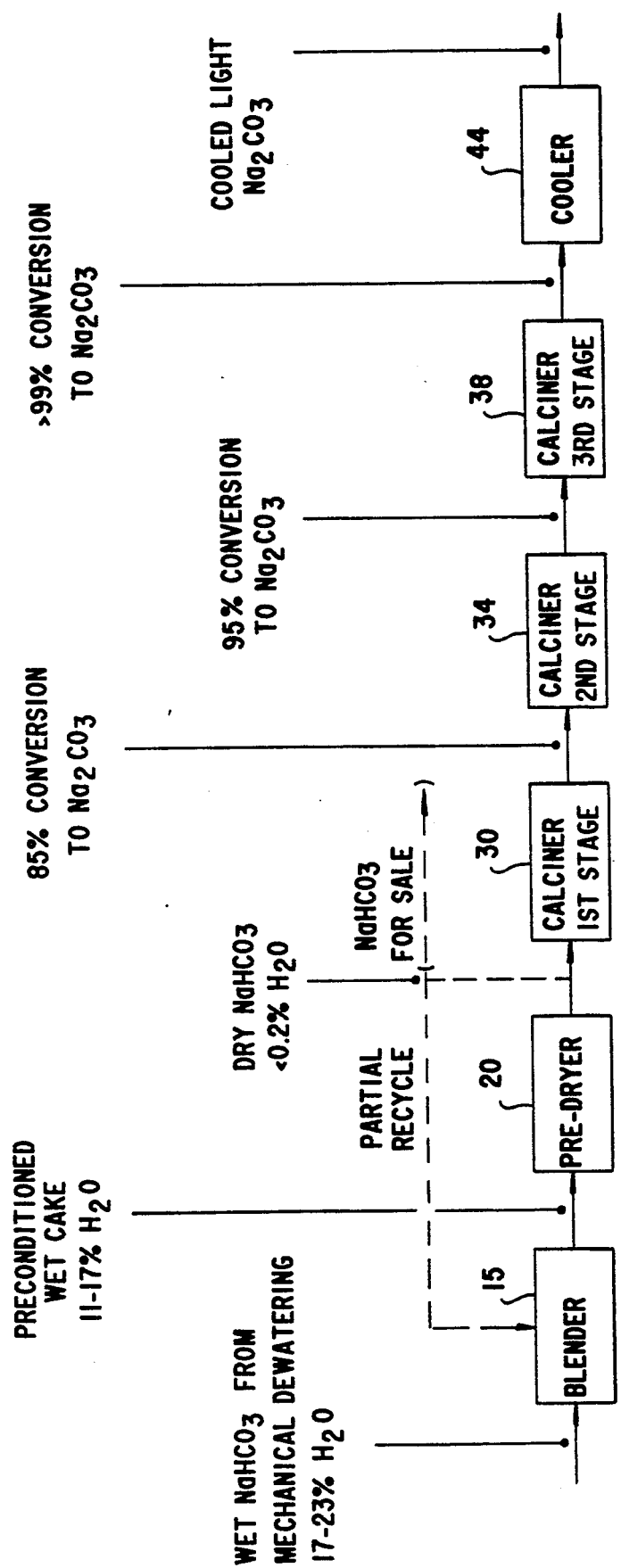
FIG. 3 is a graphic representation of the solids reaction which occurs in the method and apparatus according to the invention.
Figure 4A:
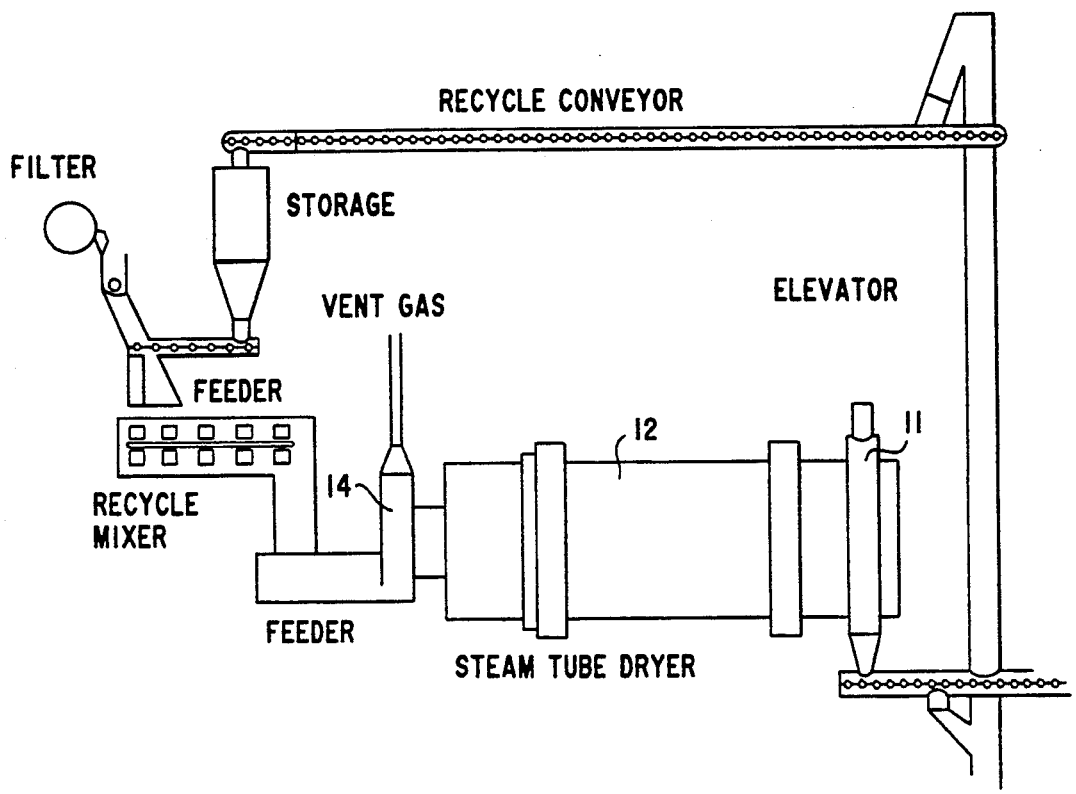
FIGS. 4(a) and 4(b) are a diagrammatic and a sectional view of an atmospheric pressure rotary stream tube dryer conventionally used in the drying of sodium bicarbonate wet cake and for the calcination of dried sodium bicarbonate.
Figure 4B:
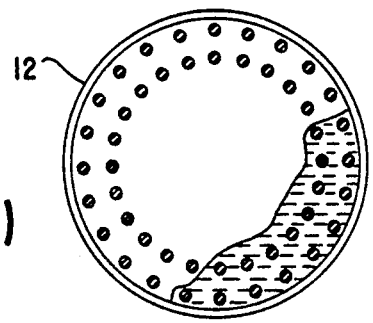

FIGS. 2 and 3 illustrate the utilities flow and solids reaction schemes of the present invention, respectively. When viewed together FIGS. 2 and 3 show the significant heat economies obtainable by practicing the invention as compared to employing conventional steam tube rotary equipment for drying and calcining sodium bicarbonate.

Conventional rotary steam tube sodium bicarbonate dryers and calciners require the use of expensive high pressure steam (~450 psig).

By practice of this invention all of the wet cake can be converted to dry sodium bicarbonate using low pressure steam (LP-S) in the pre-dryer. Further, 85% of the wet sodium bicarbonate filter cake can be converted to sodium carbonate using low pressure steam (LP-S) on the order of about 30–80 psig in the pre-dryer 20 and the first stage calciner 30. Medium pressure steam (MP-S) on the order of about 80–120 psig is used in the second calciner stage 34 to obtain 95% conversion to sodium carbonate and high pressure steam (HP-S), i.e. more than ~120 psig is used only in the third calciner stage 38 to obtain a greater than 99% conversion to sodium carbonate. Thus, it can be seen that the major part of the heat load required in the production of light sodium carbonate can be shifted from high pressure steam to low pressure steam by practice of this invention. To obtain the best steam economy the optimum steam pressure can be established by mixing high pressure steam (~450 psig) and low pressure steam (~45 psig) in thermal injector compressors.

EXAMPLE 1

During a start-up period of several hours the following actions are taken:

(1) A recirculating flow of fluidizing air is established by actuating a flow control fan or blower 24 in the closed loop through the pre-dryer 20 in the amount of 16,000 m$^3$/hr; at the pre-dryer inlet;

(2) A continuous flow of wet filter cake in the average amount of 55,600 kg/hr solids plus 11,400 kg/hr water (17% moisture) is supplied to the blender 15 of an apparatus as illustrated in FIG. 1. Light sodium bicarbonate fines from a source not shown, are supplied in continuous flow in the average amount of 27,800 kg/hr to form a blended fluidizable mass with moisture content 13.7% that is supplied, on a continuous basis, to the pre-dryer 20. During a start-up gate 25 is placed in the closed position so as to allow the pre-dryer fluid bed chamber to fill to the designed level;

(3) 45 psig steam at a rate of 15,600 kg/hr is supplied to the pre-dryer fluid bed heater 22 to bring the bed to 98° C.;

(4) Solids recycle of 27,800 kg/hr is established in the pre-dryer operation; and the sodium bicarbonate fines supply from the not shown source is terminated;

(5) Wet cake continues to flow into the blender 15 at the design rate of 67,000 kg/hr and the blended material at a rate of 94,800 kg/hr is caused to flow into the pre-dryer 20;

(6) Flow of air at design flow rate, 25,000, 2,700 and 1,700 m$^3$/hr respectively, is initiated in closed circuit through the first, second and third calciner stages 30, 34 and 38;

(7) Warm up steam is supplied to the heating elements (HE) 31 in calciners 30, 34 and 38;

(8) Gate 25 is then opened to allow fluid flow of material at the design flow rate to pass from the pre-dryer 20 into the first, second and third calciner stages to allow the calciner system to fill to design levels keeping the underflow gate 39 in the outlet of the third calciner stage 38 closed;

(9) Flow of fluidizing air at design rate of 1,200 m$^3$/hr is initiated in the product cooling section 44 by opening underflow gate 39 and the material is allowed to fill the cooler fluid bed to over flow at weir 46 to the product exit;

(10) Calcination is initiated by applying 65 psig steam to the first calciner 30 at a rate of 19,800 kg/hr and 115 psig steam at a rate of 2,700 kg/hr to the second calciner 34, thus obtaining at equilibrium a conversion of sodium bicarbonate to sodium carbonate of about 95%;

(11) 180 psig steam is then supplied to the heating elements (HE) in the third calciner stage 38 at the rate of 1,500 kg/hr to thus obtain a conversion of greater than 99%;

(12) With reference to FIG. 1 during the start-up period the nitrogen and the oxygen in the air initially present in the system is replaced by carbon dioxide evolved during the calcination process and thus in steady-state condition the recycled gases in the pre-dryer and calciner sections consist of carbon dioxide and water vapor only. The volume flow rate at the inlet of the pre-dryer and calciner stages will remain unchanged in relation to the initial recycling of atmospheric air;

(13) When steady-state conditions are obtained the production rate of light sodium carbonate is 35,000 kg/hr.

During operation of the system, carbon dioxide and water vapor is drawn through the fines filter 50 and recycled through the first, second and third calciner stages by a flow controlled fan or blower 51. A condenser 52 is also provided for operation in conjunction with a flow controlled blower 54 or 56. Blower 54 is operated to provide carbon dioxide for purging the pre-dryer 20.

A fines filter 58 is also provided over the product cooling stage 44. Cooling air is drawn through the fines filter 58 by a flow controlled blower 59.

The fines filters 50 and 58 each consist of an array of filter bags which capture or trap fines eluted from the fluidized beds 30, 34, 38 and 44. During operation, the fines filters 50 and 58 are periodically pulsed to free the fines trapped therein. As shown by FIG. 2, a compressor 55 is provided for periodically pulsing carbon dioxide to the fines filter 50 to free fines trapped therein. In a similar manner air is pulsed from a source not shown to periodically free fines trapped in the fines filter 58.

Although a specific embodiment of the process and apparatus of the invention has been disclosed, the present invention is not to be construed as limited to the particular embodiment and form disclosed herein since the foregoing description is to be regarded as illustrative rather than restrictive and it should be understood that modifications and variations in details of the above described embodiment of the invention may be made without departing from the spirit and scope of the invention as defined by the claims appended hereto.

What is claimed is:

1. Apparatus for drying and calcining sodium bicarbonate and cooling sodium carbonate comprising:
    a plurality of adjacent fluid bed sections interconnected by means permitting continuous fluid flow of particulate material from a first to a last one of said adjacent fluid bed sections, at least a first one of said fluid bed sections comprising a wet cake fluid bed dryer section, a last one of said fluid bed sections comprising a particulate material fluid bed cooling section and a sequence of adjacent fluid bed sections between said first and said last ones of said fluid bed sections comprising a plurality of adjacent fluid bed calciner sections;

means for providing an essentially carbon dioxide gas to said fluid bed dryer section to fluidize a particulate feed material delivered to said dryer section;

means for heating said fluidized particulate feed material in said fluid bed dryer section to vaporize water from said particulate feed material in said fluid bed dryer section;

means for providing a mixture of carbon dioxide and water vapor to each of said plurality of adjacent fluid bed calciner sections to fluidize particulate material in each of said fluid bed calciner sections and means to heat the particulate material in each successive fluid bed calciner section to increase the total amount of sodium bicarbonate converted to sodium carbonate in each successive fluid bed calciner section;

means for providing atmospheric air to said fluid bed cooling section to fluidize the particulate material in said fluid bed cooling section; and means for cooling said fluidized material; whereby a sodium bicarbonate wet cake material delivered to said first fluid bed dryer section is dried in said dryer section and moved as a particulate material successively through each of said fluid bed calciner sections to said fluid bed cooling section wherein it is withdrawn as a substantially anhydrous sodium carbonate particulate product.

2. The apparatus as defined by claim 1 including heating and cooling elements in said fluid bed sections.

3. The apparatus as defined by claim 1, including means for recycling carbon dioxide gas from said fluid bed dryer section and from said fluid bed calciner sections.

4. The apparatus as defined by claim 3, including filter means for intercepting fines eluted by said fluid bed calciner sections, filter means for intercepting fines eluted by said fluid bed cooling section, and said means for recycling carbon dioxide gas includes means for intermittently pulsing air and carbon dioxide gas to each of said filter means to free fines trapped by said filter means and allow said fines to return to the particulate material in said fluid bed cooling section and said adjacent fluid bed calciner sections, respectively.

5. The apparatus as defined by claim 3, wherein said means for recycling carbon dioxide gas from said fluid bed dryer section includes a fines separating apparatus for separating fines entrained in said carbon dioxide gas, means for returning said fines to said adjacent fluid bed sections and means for heating said carbon dioxide gas to serve as said means for heating said fluidized particulate feed material in said fluid bed dryer section.

6. The apparatus as defined by claim 4, wherein said means for recycling carbon dioxide gas from said fluid bed dryer section includes a fines separating apparatus for separating fines entrained in said carbon dioxide gas, means for returning said fines to said adjacent fluid bed sections and means for heating said carbon dioxide gas to serve as said means for heating said fluidized particulate feed material in said fluid bed dryer section.

7. The apparatus as defined by claim 5; wherein said means returning said fines returns said fines to said fluid bed dryer section.

8. The apparatus as defined by claim 5, wherein said means returning said fines returns said fines to said sequence of adjacent fluid bed calciner sections.

9. The apparatus as defined by claim 1, wherein said sequence of adjacent fluid bed calciner sections consists of a first, a second and a third fluid bed calciner section.

* * * * *